United States Patent
Ishige et al.

(10) Patent No.: US 6,713,169 B2
(45) Date of Patent: *Mar. 30, 2004

(54) MULTI-LAYERED STRETCHED RESIN FILM

(75) Inventors: Atsushi Ishige, Ibaraki (JP); Kazuhisa Kitamura, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/968,501

(22) Filed: Oct. 2, 2001

(65) Prior Publication Data

US 2002/0155277 A1 Oct. 24, 2002

Related U.S. Application Data

(63) Continuation-in-part of application No. PCT/JP00/02075, filed on Apr. 2, 1999.

(30) Foreign Application Priority Data

Apr. 2, 1999 (JP) ............................................. 11-096890

(51) Int. Cl.⁷ .............................. B32B 27/32; C08J 7/04
(52) U.S. Cl. ................................. 428/319.9; 428/319.7; 428/327; 428/330; 428/332; 428/334; 428/516; 428/517; 428/521; 428/910
(58) Field of Search ................................. 428/219, 220, 428/327, 330, 332, 334, 337, 319.7, 319.9, 516, 517, 521, 910

(56) References Cited

FOREIGN PATENT DOCUMENTS

| EP | 0 501 441 | 9/1992 |
|---|---|---|
| EP | 0 666 183 | 8/1995 |
| EP | 0 845 490 | 6/1998 |
| EP | 0 862 991 | 9/1998 |
| JP | 59-198149 | 11/1984 |
| JP | 8-333466 | 12/1996 |
| JP | WO00/59722 | 10/2000 |

OTHER PUBLICATIONS

Patent Abstrcts of Japan, JP 08–027294, Jan. 30, 1996.

*Primary Examiner*—D. S. Nakarani
(74) *Attorney, Agent, or Firm*—Oblon, Spivak, McClelland, Maier & Neustadt, P.C.

(57) ABSTRACT

The present invention discloses a multi-layered stretched resin film which comprises a base layer (A) containing 40 to 90 wt % of a polyolefinic resin and 10 to 60 wt % of an inorganic fine powder or an organic filler; and an amorphous resin-containing layer (B) provided on at least one side of such base layer (A), and containing 0 to 85 wt % of a polyolefinic resin and 15 to 100 wt % of an amorphous resin; where the amorphous resin-containing layer (B) has a porosity of 5% or below. Such multi-layered stretched resin film is successfully exempt from being waved or curled due to vehicle contained in offset printing ink during offset printing, and can thus ensure excellent printability.

13 Claims, 1 Drawing Sheet

Fig. 1

MULTI-LAYERED STRETCHED RESIN FILM

TECHNICAL FIELD

The present invention relates to a multi-layered stretched resin film which is successfully exempt from being waved or curled due to vehicle contained in offset printing ink during offset printing, prevented from being delayed in the ink drying property, and thus has an excellent printability. Such multi-layered stretched resin film is advantageous when used as a material for map, book cover, wrapping paper, book paper, sticker sheet, poster paper, menu sheet, hanging screen, label, shopping bag, cardboard, brochure, illuminated sign board and so forth.

BACKGROUND ART

Synthetic paper has proposed and put into practical use in recent years in place of conventional natural pulp-made paper, where the synthetic paper comprises a base layer made of a biaxially stretched polypropylene film containing 5 to 40 wt % of an inorganic fine powder, and a paper-like layer stacked on the top and back planes thereof, which is made of a uniaxially stretched polypropylene film containing 8 to 65 wt % of an inorganic fine powder (U.S. Pat. No. 418,950, Japanese Examined Patent Publication Nos. 46-40794, 60-36173 and 62-35412).

Offset printing, so-called lithograph, is generally applied for printing on paper, polyethylene terephthalate film, polyamide film, coated paper and the like, since the technique can readily provide multi-color printing. Typical composition of a general-purpose, dry-type offset printing ink is shown below.

Basic Composition of Offset printing ink

TABLE 1

Composition of Offset Printing Ink (weight part)

|  | ink for sheet printing | ink for non-paper printing | ink for rotary offset press |
|---|---|---|---|
| pigment | 25 | 25 | 25 |
| resin | 25 | 30 | 25 |
| drying oil | 20 | 34 | 10 |

TABLE 1-continued

Composition of Offset Printing Ink (weight part)

|  | ink for sheet printing | ink for non-paper printing | ink for rotary offset press |
|---|---|---|---|
| high-boiling-point, petroleum-base solvent | 25 | 5 | 36 |
| drier | 1 | 2 | — |
| others | 4 | 4 | 4 |
| total | 100 | 100 | 100 |

The vehicle described in the above refers to a liquid component among various components composing printing ink, and is responsible for dispersing pigment to thereby keep fluidity of the ink; for ensuring smooth movement of the ink from an ink pot to a printing plane after being transferred among individual rollers, plate and blanket; and for fixing the pigment onto the printing plane through solidification. In response to recent strong requirement to shorten the drying time of the offset printing ink for more rapid printing, there is an increasing trend of using quick-drying ink having compounded therein a vehicle which mainly comprises a drying oil added with resin and mineral oil (high-boiling-point, petroleum-base solvent).

Printing with such quick-drying offset printing ink on the synthetic paper comprising a polyolefinic film or such film compounded with an inorganic fine powder, however, undesirably swells the polyolefin per se due to the vehicle contained in the quick-drying offset printing ink to thereby produce local surface waving or curling of the printed film, which has been an obstacle for the practical use. So that the conventional offset printing ink for polyolefinic film has been such that having a special formula without mineral oil at the sacrifice of the quick-drying property.

Such special offset printing ink for polyolefinic film, however, requires long drying time and has been only available in limited printing works and manufacturers, so that there has been a strong need for a new polyolefinic film on which the general-purpose offset printing ink of oxidation polymerization type (drying oil type) is available.

That is, in the general printing works, offset printing is practiced on pulp-base paper such as wood free paper and coated paper using generally-commercialized, quick-drying ink, so that printing on the polyolefinic film or synthetic paper requires temporary replacement of such ink with the special offset printing ink suitable for such non-absorbent material. Such replacement of the ink is, however, considerably time- and labor-consuming, so that the general printing works have not been positive about printing on the polyolefinic film or synthetic paper, which has been one factor obstructing the generalization of the polyolefinic film or synthetic paper in offset printing.

One approach has been made (Laid-Open Japanese Patent Publication No. 8-333466), in which a polyolefinic resin added with an amorphous resin is used as a part of the multi-layered film. Such technique is, however, still not successful in solving the problem of swelling of the film (referred to as "solvent attack" hereinafter) as a whole due to vehicle (in particular high-boiling-point, petroleum-base solvent such as mineral oil) contained in the offset printing ink.

It is therefore an object of the present invention to provide a multi-layered stretched resin film excellent in ink drying property, and less causative of surface waving or entire curling even if the film is subjected to offset printing using a general-purpose, quick-drying offset printing ink.

Disclosure of the Invention

The present inventors found out after extensive investigations for solving the foregoing problems that adding an amorphous resin in a proper ratio to one layer composing a thermoplastic resin film, and stretching such film so as to lower the porosity of such layer successfully improve the solvent attack. It was also found that a proper blending of an inorganic fine powder or an organic filler in particular to the uppermost layer can improve the ink drying property and thus can provide a multi-layered stretched resin film excellent in the printing property.

The present invention is to provide a multi-layered stretched resin film comprising a base layer (A) containing 40 to 90 wt % of a polyolefinic resin and 10 to 60 wt % of an inorganic fine powder or an organic filler; and an amorphous resin-containing layer (B) provided on at least one side of such base layer (A), and containing 0 to 85 wt % of a polyolefinic resin and 15 to 100 wt % of an amorphous resin; in which amorphous resin-containing layer (B) has a porosity of 5% or below.

The amorphous resin used for the multi-layered stretched resin film of the present invention is preferably a cycloolefinic resin, and preferably has a glass transition point of 140° C. or below. The polyolefinic resin contained in the amorphous resin-containing layer (B) is any one of propylene-base resin, ethylene-base resin and a mixture thereof. The amorphous resin-containing layer (B) preferably has a thickness of 1 to 100 µm.

In the present invention, it is preferable that the multi-layered stretched resin film further comprises a surface layer (C) containing 30 to 85 wt % of a polyolefinic resin and 15 to 70 wt % of an inorganic fine powder or an organic filler, in which the surface layer (C) is provided on at least one side of a stack which comprises the base layer (A) and the amorphous resin-containing layer (B) provided on at least one side thereof. The surface layer (C) preferably has a thickness of 1 to 100 µm. The grain size of the inorganic fine powder or the average dispersion grain size of the organic filler in the surface layer (C) is preferably within a range from 0.01 to 6 µm, where the inorganic fine powder or the organic filler in the surface layer (C) preferably comprises calcium carbonate, in particular surface-modified calcium carbonate. The surface layer (C) preferably has a smoothness in compliance with JIS P-8119 of 20,000 sec or below.

In the present invention, layer constitution involving the base layer (A) and the amorphous resin-containing layer (B) and/or surface layer(C) are preferably such that being expressed as (C)/(B)/(A)/(B)/(C), (C)/(B)/(A)/(B), (C)/(B)/(A)/(C), (C)/(B)/(A), (B)/(A)/(B), (B)/(A)/(C) and (B)/(A).

It is preferable that the multi-layered stretched resin film of the present invention further comprises an intermediate layer (D) comprising a polypropylene-base resin containing 8 to 55 wt % of an inorganic fine powder, in which the intermediate layer (D) is provided between the base layer (A) and the amorphous resin-containing layer (B) or the surface layer (C). The intermediate layer (D) preferably contains any one low-melting-point resin selected from the group comprising propylene-base copolymer, high-density polyethylene, polystyrene or ethylene-vinyl acetate copolymer.

The multi-layered stretched resin film of the present invention preferably has an opacity in compliance with JIS P-8138 of 70% or above, and preferably has on the outermost layer thereof a pigment coated layer.

It should now be noted that, in this specification, any notation using a word "to" indicates a range defined by values placed before and after such word, where both ends of such range are included as minimum and maximum values.

DETAILED DESCRIPTION OF THE INVENTION

The multi-layered stretched resin film of the present invention will be detailed hereinafter. The multi-layered stretched resin film of the present invention has, as an essential constitutional element, a constitution which comprises a base layer (A) containing 40 to 90 wt % of a polyolefinic resin and 10 to 60 wt % of an inorganic fine powder or an organic filler; and an amorphous resin-containing layer (B) provided on at least one side of such base layer (A), and containing 0 to 85 wt % of a polyolefinic resin and 15 to 100 wt % of an amorphous resin. In one preferable embodiment of the present invention, the multi-layered stretched resin film further comprises a surface layer (C) containing 30 to 85 wt % of a polyolefinic resin and 15 to 70 wt % of an inorganic fine powder or an organic filler, the surface layer (C) being provided on at least one side of a stack which comprises the base layer (A) and the amorphous resin-containing layer (B). The following description will then go through the base layer (A); amorphous resin-containing layer (B) and surface layer (C) in this order, which will be followed by description of a method for producing such multi-layered stretched resin film.

Base Layer (A)

The base layer (A) of the multi-layered stretched resin film of the present invention contains 40 to 90 wt % of a polyolefinic resin and 10 to 60 wt % of an inorganic fine powder or an organic filler.

There is no special limitation on the species of the polyolefinic resin used for the base layer (A).

Examples of such polyolefinic resins include homopolymer of $C_{2-8}$ α-olefins such as ethylene, propylene, 1-butene, 1-hexene, 1-heptene, 1-octene, 4-methyl-1-pentene and 3-methyl-1-pentene; and copolymers of 2 to 5 species selected from such α-olefins. Either random copolymer or block copolymer is allowable. More specifically, allowable are branched or normal polyethylene having a density of 0.89 to 0.97 g/cm³ and a melt flow rate (190° C., 2.16 kg load) of 1 to 10 g/10 minutes; and polymers having a melt flow rate (230° C., 2.16 kg load) of 0.2 to 20 g/10 minutes such as propylene homopolymer, (4-methyl-1-pentene) homopolymer, propylene-ethylene copolymer, propylene-(1-butene) copolymer, propylene-ethylene-(1-butene) copolymer, propylene-(4-methyl-1-pentene) copolymer, propylene-(3-methyl-1-pentene) copolymer, poly(1-butene), poly(4-methyl-1-pentene) and propylene-ethylene-(3-methyl-1-pentene) copolymer. Among these, propylene homopolymer; ethylene-propylene random copolymer and high-density polyethylene are preferable in terms of inexpensiveness and formability.

The polyolefinic resin used for the base layer (A) is preferably has a melting point (peak temperature in a DSC curve) of 130 to 210° C. In particular, propylene homopolymer having a melting point (peak temperature in a DSC curve) of 155 to 174° C., a melt flow rate (JIS K-7210) of 0.5 to 10 g/10 minutes and a crystallinity of 45 to 70% is preferable. For the base layer (A), a single species may be selected from the above polyolefinic resins for independent use, or two or more species may be selected therefrom for combined use.

The inorganic fine powder used for the base layer (A) preferably has an average grain size of 0.01 to 10 μm, and more preferably 0.05 to 8 μm. The organic filler used for the base layer (A) preferably has an average dispersion grain size of 0.01 to 10 μm, and more preferably 0.05 to 8 μm.

Examples of the inorganic fine powder include heavy calcium carbonate, precipitated calcium carbonate, fired clay, talc, titanium oxide, barium sulfate, aluminum sulfate, silica, zinc oxide, magnesium oxide and diatom earth. Surface modified products of such inorganic fine powder are also available. Among these, heavy calcium carbonate, precipitated calcium carbonate, surface modified products of such calcium carbonates, clay and diatom earth are preferable in terms of inexpensiveness and void forming property in the stretching.

The organic filler is exemplified by polyethylene terephthalate, polybutylene terephthalate, polyamide, polycarbonate, polyethylene naphthalate, polystyrene, melamine resin, cyclopolyolefin, polyethylene sulfite, polyimide, polyethyl ether ketone and polyphenylene sulfite. Among these, incompatible organic fillers having a higher melting point or glass transition point than that of the polyolefinic resin to be combined therewith are preferable in terms of void formation.

For the base layer (A), a single species of the inorganic fine powder or the organic filler may be selected from the above for independent use, or two or more species may be selected therefrom for combined use. The case of combined use of two or more species allows mixed use of the organic filler and the inorganic fine powder.

As for blend ratio of the polyolefinic resin and the inorganic fine powder or organic filler, the polyolefinic resin accounts for 40 to 90 wt %, and the inorganic fine powder or organic filler accounts for 10 to 60 wt % of a total. In a more preferable case, the polyolefinic resin accounts for 60 to 90 wt %, and the inorganic fine powder or organic filler accounts for 10 to 40 wt % of a total; and in a still more preferable case, the polyolefinic resin accounts for 65 to 90 wt %, and the inorganic fine powder or organic filler accounts for 10 to 35 wt % of a total.

The base layer (A) is preferably such that having a lot of voids. The porosity thereof is preferably 10 to 55%. The porosity of the base layer (A) is now referred to ratio of sectional area of voids in the base layer (A) determined by observing a section of the multi-layered stretched resin film under a scanning electron microscope. Using such base layer (A) having a lot of voids is also beneficial in reducing weight of the multi-layered stretched resin film. The voids can be produced by stretching, where uniaxial stretching and biaxial stretching are both allowable.

The thickness of the base layer (A) is preferably 20 to 250 μm, and is more preferably 30 to 200 μm.

Amorphous Resin-Containing Layer (B)

The amorphous resin-containing layer (B) of the multi-layered stretched resin film of the present invention contains 0 to 85 wt % of a polyolefinic resin and 15 to 100 wt % of an amorphous resin.

There is no special limitation on the species of the polyolefinic resin used for the amorphous resin-containing layer (B), and those listed in the above for the base layer (A) are available. In particular, propylene homopolymer, high-density polyethylene and mixture thereof are preferable. More specifically, propylene homopolymer having a melting point (peak temperature in a DSC curve) of 155 to 174° C., a melt flow rate (JIS K-7210) of 0.5 to 20 g/10 minutes and a crystallinity of 45 to 70% is preferable. Another preferable example available therefor is high-density polyethylene having a melting point (peak temperature in a DSC curve) of 120 to 135° C., a melt flow rate (JIS K-6760) of 0.2 to 20 g/10 minutes, a crystallinity of 65 to 95%, and a density of 0.945 g/cm³ or above. The polyolefinic resin used for the amorphous resin-containing layer (B) may be a single species selected from the above for individual use, or two or more species for combined use.

The amorphous resin for use in the amorphous resin-containing layer (B) is preferably such that having a glass transition point of 140° C. or below, and more preferably 70 to 140° C. A glass transition point of the amorphous resin lower than 70° C. tends to result in adhesion of the film onto rolls and thus ruin the formability of the film, and that higher than 140° C. tends to result in excessive formation of the voids during the stretching to thereby raise the porosity, which is disadvantageous in that effectively preventing the solvent attack. When the multi-layered stretched resin film of the present invention is produced, the stretching temperature is preferably set at a temperature higher by 10° C. or more than the glass transition point of the amorphous resin.

Such amorphous resin is typically exemplified as cycloolefinic resin, atactic polystyrene, petroleum resin, polycarbonate or acrylic resin. These resins may be used individually or in any combinations of two or more thereof.

Among these, cycloolefinic resin is particularly preferable. The cycloolefinic resin is preferably any one resin selected from the group comprising ring-opened polymers derived from cycloolefinic monomer expressed by general formula (1) below; hydrogenated compounds of such polymers or copolymers; and addition polymers of cycloolefinic monomer expressed by the general formula (1) and ethylene:

(1)

where, "n" denotes 0 or a positive integer, $R^1$ to $R^{12}$ independently represents an atom or a functional group selected from the group comprising hydrogen atom, halogen atom and hydrocarbon groups, $R^9$ to $R^{12}$ may be bound with each other to form a monocyclic or polycyclic group, where such monocyclic or polycyclic group may have a double bond, and $R^9$ and $R^{10}$, or $R^{11}$ and $R^{12}$ together may form an alkylidene group.

As such cycloolefinic monomer, already known monomers disclosed for example in Japanese Laid-Open Patent Publication Nos. 2-227424, 2-276842, 5-97719, 7-41550 and 8-72210 are available. Specific examples of such cycloolefinic monomer include bicyclo[2.2.1]hepto-2-ene derivatives, tetracyclo[4.4.0.1$^{2,5}$.1$^{7,10}$]-3-dodecene derivatives, hexacyclo[6.6.1.1$^{3,6}$.1$^{10,13}$.0$^{2,7}$.0$^{9,14}$]-4- heptadencene derivatives, octacyclo[8.8.0.1$^{2,9}$.1$^{4,7}$.1$^{11,18}$.1$^{13,16}$.0$^{3,8}$.0$^{12,17}$]- 5-docosene derivatives, pentacyclo[6.6.1.1$^{3,6}$.0$^{2,7}$.0$^{9,14}$]-4-hexadecene derivatives, heptacyclo-5-eicosene derivative, heptacyclo-5-heneicosene derivatives, tricyclo[4.3.0.1$^{2,5}$]-3-decene derivatives, tricyclo[4.4.0.1$^{2,5}$]-3-undecene derivaives, pentacyclo[6.5.1.1$^{3,6}$. 0$^{2,7}$.0$^{9,13}$]-4-pentadecene derivatives, pentacyclopentadecadiene derivatives, pentacyclo[7.4.0.1$^{2,5}$.1$^{9,12}$.0$^{8,13}$]-3-pentadecene derivatives, heptacyclo[8.7.0.1$^{3,6}$.1$^{10,17}$.1$^{12,15}$.0$^{2,7}$.0$^{11,16}$]-4-eicosene derivatives, nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivative pentacytclo[8.4.0.1$^{2,5}$.1$^{9,12}$.0$^{8,13}$]-3-hexadecene derivatives, heptacyclo[8.8.0.1$^{4,7}$.1$^{11,18}$.1$^{13,16}$.0$^{3,8}$.0$^{12,17}$]-5-heneicosene derivatives, nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives, 1,4-methano-1,4,4a,9a-teterahydrofluorene derivatives, 1,4-methano-1,4,4a,5,10,10a-hexahydroanthracene derivatives, and cyclopentadiene-acenaphthylene adduct.

More specifically, possible examples thereof include bicyclo[2.2.1]hepto-2-ene derivatives such as bicyclo[2.2.1]hepto-2-ene, 6-methylbicyclo[2.2.1]hepto-2-ene, 5,6-dimethylbicyclo-[2.2.1]hepto-2-ene, 1-methylbicyclo[2.2.1]hepto-2-ene, 6-ethylbicyclo[2.2.1]hepto-2-ene, 6-n-butylbicyclo[2.2.1]hepto-2-ene, 6-isobutylbicyclo[2.2.1]hepto-2-ene and 7-methylbicyclo[2.2.1]-hepto-2-ene; tetracyclo[4.4.0.1$^{2,5}$.1$^{7,10}$]-3-dodecene derivatives such as tetracyclo[4.4.0.1$^{2,5}$.1$^{7,10}$]-3-dodecene, 8-methyltetracyclo-[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-butyl-tetracyclo[4.4.0.1$^{2,5}$.1$^{7,10}$]-3-dodecene, 8-isobutyltetracyclo[4.4.0.1$^{2,5}$.1$^{7,10}$]-3-dodecene, 8-hexyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-stearyltetracyclo[4.4.0.1$^{2,5}$.1$^{7,10}$]-3-dodecene, 5,10-dimethyltetracyclo[4.4.0.1$^{2,5}$.1$^{7,10}$]-3-dodecene, 2,10-dimethyltetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-ethyl-9-methyltetracyclo[4.4.0.1$^{2,5}$.1$^{7,10}$]-3-dodecene, 11,12-dimethyltetracyclo[4.4.0.1$^{2,5,17,10}$]-3-dodecene, 2,7,9-trimethyltetracyclo[4.4.0.1$^{2,5}$.1$^{7,10}$]-3-dodecene, 9-ethyl-2,7-dimethyltetracyclo[4.4.0.1$^{2,5}$.1$^{7,10}$]-3dodecene, 9-isobutyl-2,7-dimethyltetracyclo[4.4.0.1$^{2,5}$.1$^{7,10}$]-3-dodecene, 9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-ethyltetracyclo-[4.4.0.1$^{2,5}$.1$^{7,10}$]-3-dodecene, 8-ethylidene-9-isopropyltetracyclo-[4.4.0.1$^{2,5}$.1$^{7,10}$]-3-dodecene, 8-ethylidene-9-butyltetracyclo[4.4.0.1$^{2,5}$.1$^{7,10}$]-3-dodecene, 8-n-propylidenetetracyclo-[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo[4.4.0.1$^{2,5}$.1$^{7,10}$]-3-dodecene, 8-isopropylidene-9-ethyltetracyclo[4.4.0.1$^{2,5}$. 1$^{7,10}$]-3-dodecene,8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo-[4.4.0.1$^{2,5}$.1$^{7,10}$]-3-dodecene, 8-fluorotetracyclo[4.4.0.1$^{2,5}$.1$^{7,10}$]-3-dodecene, and 8,9-dichlorotetracyclo[4.4.0.1$^{2,5}$.1$^{7,10}$]-3-dodecene; hexacyclo[6.6.1.1$^{3,6}$.1$^{10,13}$.0$^{2,7}$.0$^{9,14}$]-4-heptadecene derivatives such as hexacyclo[6.6.1.1$^{3,6}$.1$^{10,13}$.0$^{2,7}$.0$^{9,14}$]4-heptadecene, 12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,79,14}$]-4-heptadecene, 12-isobutylhexacyclo[6.6.1.1$^{3,6}$.1$^{10,13}$.0$^{2,7}$.0$^{9,14}$]-4-heptadecene, and 1,6,10-trimethyl-12-isobutylhexacyclo[6.6.1.1$^{3,6}$.1$^{10,13}$.0$^{2,7}$.0$^{9,14}$]-4-hepta-decene; octacyclo[8.8.0.1$^{2,9}$.1$^{4,7}$.1$^{11,18}$.1$^{13,16}$.0$^{3,8}$.0$^{12,17}$]-5-docosene derivatives such as octacyclo[8.8.0.1$^{2,9}$.1$^{4,7}$.1$^{11,18}$.1$^{13,16}$.0$^{3,8}$.0$^{12,17}$]-5-docosene, 15-methyloctacyclo[8.8.0.1$^{2,9}$.1$^{4,7}$.1$^{11,18}$.1$^{13,16}$.0$^{3,8}$.0$^{12,17}$]-5-docosene, and 15-ethyloctacyclo[8.8.0.1$^{2,9}$.1$^{4,7}$.1$^{11,18}$.1$^{13,16}$.0$^{3,8}$.0$^{12,17}$]-5-docosene; pentacyclo[6.6.1.1$^{3,6}$.0$^{2,7}$.0$^{9,14}$]-4-hexadecene derivatives such as pentacyclo[6.6.1.1$^{3,6}$.0$^{2,7}$.0$^{9,14}$]-4-hexadecene, 1,3-dimethylpentacyclo[6.6.1.1$^{3,6}$.0$^{2,7}$.0$^{9,14}$]-4-hexadecene, 1,6-dimethylpentacyclo[6.6.1.1$^{3,6}$.0$^{2,7}$.0$^{9,14}$]4-hexadecene and 15,16-dimethylpentacyclo[6.6.1.1$^{3,6}$.0$^{2,7}$.0$^{9,14}$]-4-hexadecene; heptacyclo-5-eicosene derivatives or heptacyclo-5-heneicosene derivatives such as heptacyclo[8.7.0.1$^{2,9}$.1$^{4,7}$.1$^{11,17}$.0$^{3,8}$.0$^{12,16}$]-5-eicosene and heptacyclo[8.8.0.1$^{2,9}$.1$^{4,7}$.1$^{11,18}$.0$^{3,8}$.0$^{12,17}$]-5-heneicosene; tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene; tricyclo[4.4.0.1$^{2,5}$]-3-undecene derivatives such as tricyclo[4.4.0.1$^{2,5}$]-3-undecene and 10-methyltricyclo[4.4.0.1$^{2,5}$]-3-undecene; pentacyclo[6.5.1.1$^{3,6}$.0$^{2,7}$.0$^{9,13}$]-4-pentadecene derivatives such as pentacyclo[6.5.1.1$^{3,6}$.0$^{2,7}$.0$^{9,13}$]-4-pentadecene, 1,3-dimethylpentacyclo[6.5.1.1$^{3,6}$.0$^{2,7}$.0$^{9,13}$]-4-pentadecene, 1,6-dimethylpentacyclo[6.5.1.1$^{3,6}$.0$^{2,7}$.0$^{9,13}$]-4-pentadecene and 14,15-dimethylpentacyclo[6.5.1.1$^{3,6}$.0$^{2,7}$.0$^{9,13}$]-4-pentadecene; diene compounds such as pentacyclo[6.5.1.1$^{3,6}$.0$^{2,7}$.0$^{9,13}$]-4,10-pentadecadiene; pentacyclo[7.4.0.1$^{2,5}$.1$^{9,12}$.0$^{8,13}$]-3-pentadecene derivatives such as pentacyclo[7.4.0.1$^{2,5}$.1$^{9,12}$.0$^{8,13}$]-3-pentadecene and methyl-substituted pentacyclo[7.4.0.1$^{2,5}$.1$^{9,12}$.0$^{8,13}$]-3-pentadecene; heptacyclo-[8.7.0.1$^{3,6}$.1$^{10,17}$.1$^{12,15}$.0$^{2,7}$.0$^{11,16}$]-4-eicosene derivatives such as heptacyclo[8.7.0.1$^{3,6}$.1$^{10,17}$.1$^{12,15}$.0$^{2,7}$.0$^{11,16}$]-4-eicosene and dimethyl-substituted heptacyclo[8.7.0.1$^{3,6}$.1$^{10,17}$.1$^{12,15}$.0$^{2,7}$.0$^{11,16}$]-4 eicosene; nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives such as nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and trimethyl-substituted nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene; pentacyclo[8.4.0.1$^{2,5}$.1$^{9,12}$.0$^{8,13}$]-3-hexadecene derivatives such as pentacyclo[8.4.0.1$^{2,5}$.1$^{9,12}$.0$^{8,13}$]-3-hexadecene, 11-methylpentacyclo[8.4.0.1$^{2,5}$.1$^{9,12}$.0$^{8,13}$]-3-hexadecene, 11-ethylpentacyclo[8.4.0.1$^{2,5}$.1$^{9,12}$.0$^{8,13}$]-3-hexadecene and 10,11-dimethylpentacyclo[8.4.0.1$^{2,5}$.1$^{9,12}$.0$^{8,13}$]-5-hexadecene; heptacyclo[8.8.0.1$^{4,7}$.1$^{11,18}$.1$^{13,16}$.0$^{3,8}$.0$^{12,17}$]-5-heneicosene derivatives such as heptacyclo[8.8.0.1$^{4,7}$.1$^{11,18}$.1$^{13,16}$.0$^{3,8}$.0$^{12,17}$]-5-heneicosene, 15-methyl-heptacyclo[8.8.0.1$^{4,7}$.1$^{11,18}$.1$^{13,16}$.0$^{3,8}$.0$^{12,17}$]-5-heneicosene and trimethylheptacyclo[8.8.0.1$^{4,7}$.1$^{11,18}$.1$^{13,16}$.0$^{3,8}$.0$^{12,17}$]-5-heneicosene; nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivative such as nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene; pentacyclo[6.5.1.1$^{3,6}$.0$^{2,7}$.0$^{9,13}$]-4,11-pentadecadiene, methyl-substituted pentacyclo-[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, trimethyl-substituted pentacyclo[4.7.0.1$^{2,5}$.0$^{8,13}$.1$^{9,12}$]-3-pentadecene, pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, methyl-substituted heptacyclo[7.8.0.1$^{3,6}$.0$^{2,7}$.1$^{10,17}$.0$^{11,16}$.1$^{12,15}$]-4-eicosene, trimethyl-substituted heptacyclo-[7.8.0.1$^{3,6}$.0$^{2,7}$.1$^{10,17}$.0$^{11,16}$.1$^{12,15}$]-4-eicosene, tetramethyl-substituted heptacyclo[7.8.0.1$^{3,6}$.0$^{2,7}$.1$^{10,17}$.0$^{11,16}$.1$^{12,15}$]-4-eicosene, tricyclo[4.3.0.1$^{2,5}$]-3,7-decadiene (i.e., dicyclopentadiene), 2,3-dihydrodicyclopentadiene, 5-phenylbicyclo [2.2.1]hepto-2-ene (i.e., 5-phenyl2-norbornen), 5-methyl-5-phenylbicyclo[2.2.1]hepto-2-ene, 5-benzylbicyclo[2.2.1]hepto-2-ene, 5-tolylbicyclo[2.2.1]hepto-2-ene, 5-(ethylphenyl)-bicyclo[2.2.1]hepto-2-ene, 5-(isopropylphenyl)-bicyclo[2.2.1]hepto-2-ene, 8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene, 8-benzyltetracyclo[4.4.0.1$^{2,5}$.1$^{7,10}$]-3-dodecene, 8-tolyltetracyclo[4.4.0.1$^{2,5}$.1$^{7,10}$]-3-dodecene, 8-(ethylphenyl)-tetracyclo[4.4.0.1$^{2,5}$.1$^{7,10}$]-3-dodecene, 8-(isopropylphenyl)-tetracyclo-[4.4.0.1$^{2,5}$.1$^{7,10}$]-3-dodecene, 8,9-diphenyltetracyclo[4.4.0.1$^{2,5}$.1$^{7,10}$]-3-dodecene, 8-(biphenyl)-tetracyclo[4.4.0.1$^{2,5}$.1$^{7,10}$]3-dodecene, 8-(a-naphthyl)-tetracyclo[4.4.0.1$^{2,5}$.1$^{7,10}$]-3-dodecene, 8-(α-naphthyl)-tetracyclo[4.4.0.1$^{2,5}$.1$^{7,10}$]-3-dodecene, 8-(anthracenyl)-tetracyclo[4.4.0.1$^{2,5}$.1$^{7,10}$]-3-dodecene, 11-phenylhexacyclo[6.6.1.1$^{3,6}$.0$^{2,7}$.0$^{9,14}$]-4-heptadecene, 6-(α-naphthyl)-bicyclo[2.2.1]-hepto-2-ene, 5-(anthracenyl)-bicyclo[2.2.1]-hepto-2-ene, 5-(biphenyl)-bicyclo[2.2.1]-hepto-2-ene, 5-(â-naphthyl)-bicyclo[2.2.1]-hepto-2-ene, 5,6-diphenylbicyclo[2.2.1]-hepto-2-ene, 9-(2-norbornen-5-yl)-carbazole and 1,4-methano-1,4,4a,4b,5,8,8a,9a-octahydrofluorene compounds; 1,4-methano-1,4,4a,9a-tetrahydrofluorene compounds such as 1,4-methano-1,4,4a,9a-tetrahydrofluorene, 1,4-methano-8-methyl-1,4,4a,9a-tetrahydrofluorene, 1,4-methano-8-chloro-1,4,4a,9a-tetrahydrofluorene and 1,4-methano-8-bromo-1,4,4a,9a-tetrahydrofluorene; 1,4-methano-1,4,4a,9a-tetrahydrodibenzofuran compounds; 1,4-methano-1,4,4a,9a-tetrahydrocarbazole compounds such as 1,4-methano-1,4,4a,9a-tetrahydrocarbazole and 1,4-methano-9-phenyl-1,4,4a,9a-tetrahydrocarbazole; 1,4-methano-1,4,4a,5,10,10a-hexahydroanthracene; compounds such as 1,4-methano-1,4,4a,5,10,10a-hexahydroanthracene; 7,10-methano-6b,7,10,10a-tetrahydrofluoranthene compounds; cyclopentadiene-acenaphthylene adduct further added with cyclopentadiene, 11,12-benzo-pentacyclo-[6.5.1.1$^{3,6}$.0$^{2,7}$.0$^{9,13}$]-4-pentadecene, 11,12-benzo-pentacyclo[6.6.1.1$^{3,6}$.0$^{2,7}$.0$^{9,14}$]-4-hexadecene, 14,15-benzo-heptacyclo[8.7.0.1$^{2,9}$.1$^{4,7}$.1$^{11,17}$.0$^{3,8}$.0$^{12,16}$]-5-eicosene and cyclopentadiene-acenaphthylene adduct. These cycloolefinic monomers are available individually, or in any combinations of two or more thereof.

The hydrogenated compounds of the ring-opened polymer of the cycloolefin can be obtained by techniques such as those disclosed for example in Japanese Laid-Open Patent Publication Nos. 60-26024, 63-218727 and 63-23201, by which the cycloolefin is polymerized typically using a polymerization catalyst comprising a metal compound, and then hydrogenated by well-known methods typically using a polymerization catalyst generally used for hydrogenation of olefin compounds.

Production method of a random copolymer with ethylene is typically found in Japanese Laid-Open Patent Publication No. 60-168708, in which the polymerization is proceeded using a catalyst comprising a vanadium compound and a halogen-containing, organo-aluminum compound. The molar fraction of ethylene in such case is preferably 40 to 90%.

As for the blend ratio of the polyolefinic resin and the amorphous resin in the amorphous resin-containing layer (B), the polyolefinic resin accounts for 0 to 85 wt %, and the amorphous resin accounts for 15 to 100%. The ratio of the amorphous resin less than 15 wt % will degrade the preventive effect against the solvent attack. A preferable blend ratio is such that containing the polyolefinic resin in an amount of 20 to 80 wt %, and the amorphous resin in an amount of 20 to 80 wt %.

The porosity of the amorphous resin-containing layer (B) must be 5% or below, and is more preferably 3% or below. The porosity of the amorphous resin-containing layer (B) is now referred to ratio of sectional area of voids in the amorphous resin-containing layer (B) determined by observing section of the multi-layered stretched resin film under a scanning electron microscope. The porosity exceeding 5% will result in penetration of the vehicle (in particular high-boiling-point, petroleum-base solvent such as mineral oil) in the offset printing ink through the voids to reach the base layer (A), to thereby swell the entire film, which is so-called solvent attack. It is also allowable to add an inorganic fine powder or an organic filler to the amorphous resin-containing layer (B) so far as the porosity is controlled at 5% or below.

While being not adhering to any theories, it is supposed that the surface waving or curling is successfully avoided because the amorphous resin added to the amorphous resin-containing layer (B) can effectively suppress the swelling of the amorphous resin-containing layer (B) per se ascribable to the vehicle (in particular high-boiling-point, petroleum-base solvent such as mineral oil) in the offset printing ink, and because the scarcity of the voids in the amorphous resin-containing layer (B) makes it difficult for the vehicle to penetrate such amorphous resin-containing layer (B) to reach the base layer (A) both of which effectively prevent the multi-layered resin film per se from being swollen. Thus the multi-layered stretched resin film of the present invention allows use of the general-purpose, quick-drying (drying oil type) offset printing ink.

The thickness of the amorphous resin-containing layer (B) is preferably 1 to 100 μm.

Surface Layer (C)

There is no special limitation on the species of the polyolefinic resin used for the surface layer (C), and those listed in the above for the base layer (A) are available. The polyolefinic resin used for the surface layer (C) is preferably has a melting point (peak temperature in a DSC curve) of 130 to 210° C. In particular, propylene homopolymer having a melting point (peak temperature in a DSC curve) of 155 to 174° C., a melt flow rate (JIS K-7210) of 0.5 to 20 g/10 minutes and a crystallinity of 45 to 70% is preferable. For the surface layer (C), a single species may be selected from the above polyolefinic resins listed for the base layer (A) for independent use, or two or more species may be selected therefrom for combined use.

The inorganic fine powder used for the surface layer (C) preferably has an average grain size of 0.01 to 6 μm, more preferably 0.05 to 4 μm, and still more preferably 0.07 to 2 μm. The organic filler used for the surface layer (C) preferably has an average dispersion grain size of 0.01 to 6 μm, more preferably 0.05 to 4 μm, and still more preferably 0.07 to 2 μm.

Examples of the inorganic fine powder include heavy calcium carbonate, precipitated calcium carbonate, fired clay, talc, titanium oxide, barium sulfate, aluminum sulfate, silica, zinc oxide, magnesium oxide and diatom earth. Surface modified products of the above inorganic fine powders using various surface modifiers are also exemplified. Among these, heavy calcium carbonate, precipitated calcium carbonate, surface modified products of these calcium carbonates, clay and diatom earth are preferable in terms of inexpensiveness and void forming property in the stretching. Still more preferable are surface modified products of heavy calcium carbonate and precipitated calcium carbonate using various surface modifiers. Examples of the surface modifiers include resin acid, aliphatic acid, organic acid, sulfate ester type anionic surfactant, sulfonate type anionic surfactant, petroleum resin acid, and sodium, potassium or ammonium salts thereof, or aliphatic esters, or aliphatic esters or resinate esters thereof, wax and paraffin. It is also preferable to use nonionic surfactant, diene-base polymer, titanate coupling agents, silane coupling agents and phosphate coupling agents. Examples of the sulfate-ester-type anionic surfactant include long-chain alcohol sulfate ester, polyoxyethylene-alkylether sulfate ester, sulfated oil, and sodium or potassium salts thereof; examples of the sulfonate-type anionic surfactant include alkylbenzenesulfonic acid, alkylnaphthalenesulfonic acid, paraffinsulfonic acid, α-olefinsulfonic acid, alkylsulfosuccinic acid, and sodium or potassium salts thereof. Examples of the aliphatic acid include caproic acid, caprylic acid, pelargonic acid, capric acid, undecanoic acid, lauric acid, myristic acid, palmitic acid, stearic acid, behenic acid, oleic acid, linoleic acid, linolenic acid and eleostearic acid; examples of the organic acid include maleic acid and sorbic acid; examples of diene-base polymer include polybutadiene and isoprene; examples of nonionic surfactant include polyethyleneglycol ester type surfactant. These surface modifiers maybe used individually or in any combinations of two or more thereof.

The organic filler is exemplified by polyethylene terephthalate, polybutylene terephthalate, polyamide, polycarbonate, polyethylene naphthalate, polystyrene, melamine resin, cyclopolyolefin, polyethylene sulfite, polyimide, polyethyl ether ketone and polyphenylene sulfite. Among these, incompatible organic fillers having a higher melting point or glass transition point than that of the polyolefinic resin to be combined therewith are preferable in terms of void formation.

For the surface layer (C), a single species of the inorganic fine powder or the organic filler may be selected from the above for independent use, or two or more species may be selected therefrom for combined use. The case of combined use of two or more species allows mixed use of the organic filler and the inorganic fine powder.

The thickness of the surface layer (C) is preferably 1 to 100 μm, and is more preferably 1.5 to 50 μm.

Production of Multi-Layered Stretched Resin Film

There is no special limitation on the production method of the multi-layered stretched resin film of the present invention. Any films produced according to any methods will be included within the scope of the present invention provided that they satisfy the conditions described in Claims. The following paragraphs deal with preferable methods for producing the multi-layered stretched resin film of the present invention.

The multi-layered stretched resin film of the present invention can be produced by first kneading under fusion a resin composition for the base layer (A), extruding the kneaded resin in a sheet form; stretching the sheet 4 to 7-fold in the longitudinal direction effected by difference in the peripheral speeds of a number of roller groups; laminating the stretched sheet with a sheet of the amorphous resin-containing layer (B) and with, as required, the surface layer (C), resin compositions of which being previously kneaded separately under fusion, so as to obtain a desired layer constitution; stretching the laminate 4 to 12-fold using a tenter in the transverse direction at a temperature lower by 5 to 350° C. than the melting point of the olefinic polymer in the base layer, and higher by 10° C. or more than the glass transition point of the amorphous resin; and then subjecting the resultant film to annealing and cooling.

Another allowable process relates to that the resin compositions for the base layer (A), the amorphous resin-containing layer (B), and the surface layer (C) employed as necessary, are separately kneaded under fusion, the compositions are extruded in a sheet form so as to obtain a desired layer constitution, the extruded sheet is stretched 4 to 7-fold in the longitudinal direction effected by difference in the peripheral speeds of a number of roller groups at a temperature higher by 10° C. or more than the glass transition point of the amorphous resin; the resultant sheet was further stretched 4 to 12-fold using a tenter in the transverse direction at a temperature lower by 5 to 35° C. than the melting point of the polyolefinic polymer in the base layer, and higher by 10° C. or more than the glass transition point of the amorphous resin; and the resultant film is then subjected to annealing and cooling. Still another possible process relates to that the resin compositions for the base layer (A), the amorphous resin-containing layer (B), and the surface layer (C) employed as necessary, are separately kneaded under fusion, the compositions are extruded in a sheet form so as to obtain a desired layer constitution, the extruded sheet is stretched 4 to 7-fold in the longitudinal direction effected by difference in the peripheral speeds of a number of roller groups at a temperature higher by 10° C. or more than the glass transition point of the amorphous resin; and the resultant film is then subjected to annealing and cooling.

There is no specific limitation on the layer constitution of the multi-layered stretched resin film of the present invention provided that the film includes a structure in which the amorphous resin-containing layer (B) is provided on one side of the base layer (A). The amorphous resin-containing layer (B) may be provided on either side of the base layer (A) or on both sides of the base layer (A). In the present invention, it is also preferable that the surface layer (C) is provided on at least one side of a stack comprising the base layer (A) and the amorphous resin-containing layer (B) provided on at least one side of such base layer (A). The surface layer (C) may be provided on either side of the stack or on both sides of the stack.

The multi-layered stretched resin film of the present invention preferably has an opacity (measured in compliance with JIS P-8138) of 70% or above. An opacity smaller than 70% tends to fail in obtaining paper texture. The thickness of the multi-layered stretched resin film of the present invention is preferably 30 to 450 μm.

Particularly preferable layer constitution of the multi-layered stretched resin film of the present invention is such that expressed as (C)/(B)/(A)/(B)/(C), (C)/(B)/(A)/(B), (C)/(B)/(A)/(C), (C)/(B)/(A), (B)/(A)/(B), (B)/(A)/(C) or (B)/(A) It should now be noted that notation "(B)/(A)" represents a constitution in which the amorphous resin-containing layer (B) is provided on the base layer (A). An additional layer other than the base layer (A), amorphous resin-containing layer (B) and surface layer (C) can be provided between arbitrary adjacent layers. Such additional layer can properly be selected depending on applications and desired functions of the multi-layered stretched resin film.

For example, it is preferable for enhancing paper-like texture of the multi-layered stretched resin film to provide a propylene resin-base intermediate layer containing 8 to 55 wt % of an inorganic fine powder between the base layer (A) and the amorphous resin-containing layer (B) or the surface layer (C). It is also preferable to add to such intermediate layer a small amount of a low-melting-point resin such as propylene-base copolymer, high-density polyethylene, polystyrene and ethylene-vinyl acetate copolymer for the purpose of improving the stretching property.

In order to improve the offset printability, it is also allowable to modify the surface of the multi-layered stretched resin film by corona discharge treatment, flame treatment or coating of a water-soluble primer selected from the group consisting of ethyleneimine adducts such as polyethyleneimine, butylated polyethyleneimine, hydroxypropylated polyethyleneimine, hydroxyethylated polyethyleneimine, 2,3-dihydroxypropylated polyethyleneimine, poly(ethyleneimine-urea), and polyamine polyamide; epichlorohydrin adducts such as polyamine polyamide; and ternary or quaternary nitrogen-containing acrylic resin.

In order to further improve the offset printing suitability of the multi-layered stretched resin film of the present invention, a pigment coated layer can be provided on at least one plane to be printed. Such pigment coated layer can be formed by pigment coating according to general coating procedures for producing coated paper.

A pigment coating material used for the pigment coating is exemplified as a latex used for producing general coated layer, which contains 30 to 80 wt % of a pigment such as clay, talc, calcium carbonate, magnesium carbonate, aluminum hydroxide, silica, calcium silicate and plastic pigment, and 20 to 70 wt % of an adhesive.

Examples of the adhesive available herein include latex such as SBR (styrene-butadiene copolymeric rubber), MBR (methacrylate-butadiene copolymeric rubber); acrylic emulsion, starch, PVA (polyvinyl alcohol), CMC (carboxymethyl cellulose) and methyl cellulose.

Such pigment coating material may further be added with a dispersion aid typically comprising a special sodium polycarboxylate such as acrylic acid/sodium acrylate copolymer, or with a crosslinking agent such as polyamide-urea-base resin. Such pigment coating agent is generally used in a form of a water-soluble coating agent having a solid concentration of 15 to 70 wt %, and more preferably 35 to 65 wt %.

Methods for coating such coating agent onto the multi-layered stretched resin film is exemplified as gravure coating, Mayer bar coating, roll coating, blade coating or size press coating. The amount of coating is generally 0.01 to 20 g/m$^2$, and more preferably 0.1 to 15 g/m$^2$.

Next, the present invention will further be detailed referring to specific Examples, Comparative Examples and Test Examples. Materials, amount of use thereof, ratio of use, operations or the like can properly be modified without departing from the spirit of the present invention. Thus it is to be understood that the present invention is by no means limited to the specific examples explained below.

EXAMPLES 1 TO 19 and

Comparative Examples 2 and 3

A composition (A) was prepared by mixing 80 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to the mixture 12 wt % of calcium carbonate having an average grain size of 1.5 μm. The composition (A) was kneaded under fusion in an extruder set at 270° C., extruded from a die in a sheet form, and then cooled using a cooling apparatus to thereby produce a non-stretched sheet. The sheet was re-heated up to 140° C. and stretched five-fold in the longitudinal direction effected by difference in the peripheral speeds of a number of roller groups.

A composition (B) was separately prepared by mixing an amorphous resin with a polyolefinic resin listed in Table 3 in an amount again listed in Table 3. A composition (C) was separately prepared by mixing an inorganic fine powder listed in Table 3 in an amount again listed in Table 3 with a propylene homopolymer having an MFR of 4.0 g/10 minutes (peak melting temperature=160° C., melting completion temperature=167° C.). A composition (D) was separately prepared by mixing 50 wt % of a propylene homopolymer having an MFR of 4.0 g/10 minutes (peak melting temperature=160° C., melting completion temperature=167° C.) with 50 wt % of a calcium carbonate having an average grain size of 1.5 μm. The compositions (B), (C) and (D) were individually kneaded under fusion in separate extrusion machines set at 270° C., stacked within a single die, co-extruded from the die, and the obtained stacked sheet was laminated on one side of the foregoing 5-fold stretched sheet (A) so as to attain a constitution expressed as (C)/(B)/(D)/(A). The same stacked sheet was also laminated on the opposite side to thereby obtain seven-layered constitution expressed as (C)/(B)/(D)/(A)/(D)/(B)/(C).

The seven-layered stack was heated to 155° C., stretched 7.5-fold in the transverse direction using a tenter, and annealed at 163° C. to thereby obtain a seven-layered film. The surface of such seven-layered film was subjected to corona discharge treatment to thereby obtain a seven-layered, stretched resin film having a constitution expressed as (C)/(B)/(D)/(A)/(D)/(B)/(C) (in 4 μm/4 μm/22 μm/70 μm/22 μm/4 μm/4 μm thick).

Such procedures were repeated while changing the species and the amount of use of the amorphous resin and polyolefinic resin for the amorphous resin-containing layer (B) and the inorganic fine powder for the surface layer (C) as listed in Table 3, to thereby obtain 21 types of the multi-layered stretched resin films according to Examples 1 to 19 and Comparative Examples 2 and 3. Details of the amorphous resins, polyolefinic resins and inorganic fine powders used herein are as listed in Table 2.

Comparative Example 1

A seven-layered stretched resin film was obtained similarly as described in Example 1, except that the amorphous resin-containing layer (B) is altered to a layer comprising 55 wt % of a propylene homopolymer having an MFR of 5.0 g/10 minutes (peak melting temperature=160° C., melting completion temperature=167° C.) and 45 wt % of calcium carbonate having an average grain size of 1.25 μm.

EXAMPLE 20

A composition (A) was prepared by mixing 80 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to such mixture 12 wt % of calcium carbonate having an average grain size of 1.5 μm. The composition (A) was kneaded under fusion in an extruder set at 270° C., extruded from a die in a sheet form, and then cooled using a cooling apparatus to thereby produce a non-stretched sheet. The sheet was re-heated up to 140° C. and stretched five-fold in the longitudinal direction effected by difference in the peripheral speeds of a number of roller groups.

A composition (B) was separately prepared by mixing an amorphous resin with a polyolefinic resin listed in Table 3 in an amount again listed in Table 3. A composition (C) was separately prepared by mixing an inorganic fine powder listed in Table 3 in an amount again listed in Table 3 with a propylene homopolymer having an MFR of 4.0 g/10 minutes (peak melting temperature=160° C., melting completion temperature=167° C.). The compositions (B) and (C) were individually kneaded under fusion in separate extrusion machines set at 270° C., stacked within a single die, co-extruded from the die, and the obtained stacked sheet was laminated on one side of the foregoing 5-fold stretched sheet (A) so as to direct the surface layer (C) outward. The same stacked sheet was also laminated on the opposite side so as to direct the surface layer (C) outward, to thereby obtain a five-layered stack.

The five-layered stack was heated to 155° C., stretched 7.5-fold in the transverse direction using a tenter, and annealed at 163° C. to thereby obtain a five-layered film. The surface of such five-layered film was subjected to corona discharge treatment to thereby obtain a five-layered, stretched resin film having a constitution expressed as (C)/(B)/(A)/(B)/(C) (in 15 μm/15 μm/70 μm/15 μm/15 μm thick)

EXAMPLE 21

A composition (A) was prepared by mixing 80 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to such mixture 12 wt % of calcium carbonate having an average grain size of 1.5 μm. A composition (B) was separately prepared by mixing an amorphous resin with a polyolefinic resin listed in Table 3 in an amount again listed in Table 3. A composition (C) was separately prepared by mixing an inorganic fine powder listed in Table 3 in an amount again listed in Table 3 with a propylene homopolymer having an MFR of 4.0 g/10 minutes (peak melting temperature=160° C., melting completion temperature=167° C.). The compositions (A), (B) and (C) were individually kneaded under fusion in separate extrusion machines set at 270° C., stacked within a single die so as to attain a layer constitution of (C)/(B)/(A)/(B)/(C), co-extruded from the die, and then cooled using a cooing apparatus to thereby produce a non-stretched sheet. The sheet was heated to 155° C., and stretched five-fold in the longitudinal direction effected by difference in the peripheral speeds of a number of roller groups. The sheet was then again heated to 155° C., stretched 7.5-fold in the transverse direction using a tenter, and annealed at 163° C. to thereby obtain a five-layered film. The surface of such five-layered film was subjected to corona discharge treatment to thereby obtain a five-layered, stretched resin film having a constitution expressed as (C)/(B)/(A)/(B)/(C) (in 5 μm/5 μm/50 μm/5 μm/5 μm thick)

EXAMPLE 22

A composition (A) was prepared by mixing 72 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to such mixture 20 wt % of calcium carbonate having an average grain size of 1.5 μm. A composition (B) was separately prepared by mixing an amorphous resin with a polyolefinic resin listed in Table 3 in an amount again listed in Table 3. A composition (C) was separately prepared by mixing an inorganic fine powder listed in Table 3 in an amount again listed in Table 3 with a propylene homopolymer having an MFR of 4.0 g/10 minutes (peak melting temperature=160° C., melting completion temperature=167° C.). The compositions (A), (B) and (C) were individually kneaded under fusion in separate extrusion machines set at 270° C., co-extruded from a single die into a sheet form so as to attain a layer constitution of (C)/(B)/(A)/(B)/(C), and then cooled using a cooling apparatus to thereby produce a non-stretched sheet. The sheet was heated to 140° C., and stretched five-fold in the longitudinal direction effected by difference in the peripheral speeds of a number of roller groups. The sheet was then annealed at 145° C. to thereby obtain a five-layered film. The surface of such five-layered film was subjected to corona discharge treatment to thereby obtain a five-layered, stretched resin film having a constitution expressed as (C)/(B)/(A)/(B)/(C) (in 15 μm/15 μm/70 μm/15 μm/15 μm thick).

EXAMPLES 23 TO 34 and

Comparative Examples 5 and 6

A composition (A) was prepared by mixing 80 wt % of a propylene homopolymer having a melt flow rate (MFR) of 0.8 g/10 minutes (peak melting temperature=160° C., melting completion temperature=167° C.) 10 and 8 wt % of a high-density polyethylene, and by further adding to the mixture 12 wt % of calcium carbonate having an average grain size of 1.5 μm. The composition (A) was kneaded under fusion in an extruder set at 270° C., extruded from a die in a sheet form, and then cooled using a cooling apparatus to thereby produce a non-stretched sheet. The sheet was re-heated up to 140° C. and stretched five-fold in the longitudinal direction effected by difference in the peripheral speeds of a number of roller groups.

A composition (B) was separately prepared by mixing an amorphous resin with a polyolefinic resin listed in Table 4 in an amount again listed in Table 4. A composition (D) was separately prepared by mixing 50 wt % of a propylene homopolymer having an MFR of 4.0 g/10 minutes (peak melting temperature=160° C., melting completion temperature=167° C.) with 50 wt % of a calcium carbonate having an average grain size of 1.5 μm. The compositions (B) and (D) were individually kneaded under fusion in separate extrusion machines set at 270° C., stacked within a single die, co-extruded from the die, and the obtained stacked sheet was laminated on one side of the foregoing 5-fold stretched sheet (A) so as to direct the amorphous resin-containing layer (B) outward. The same stacked sheet was also laminated on the opposite side so as to direct the amorphous resin-containing layer (B) outward, to thereby obtain five-layered stack.

The five-layered stack was heated to 155° C., stretched 7.5-fold in the transverse direction using a tenter, and annealed at 163° C. to thereby obtain a five-layered film. The surface of such five-layered film was subjected to corona discharge treatment to thereby obtain a five-layered, stretched resin film having a constitution expressed as (B)/(D)/(A)/(D)/(B) (in 5 μm/25 μm/70 μm/25 μm/5 μm thick).

Such procedures were repeated while changing the species and the amount of use of the amorphous resin and polyolefinic resin for the amorphous resin-containing layer (B) as listed in Table 4, to thereby obtain 14 types of the multi-layered stretched resin films according to Examples 23 to 34 and Comparative Examples 5 and 6. Details of the amorphous resins, polyolefinic resins and inorganic fine powders used herein are as listed in Table 2.

Comparative Example 4

A five-layered stretched resin film was obtained similarly as described in Example 23, except that the amorphous resin-containing layer (B) is altered to a layer comprising 55 wt % of a propylene homopolymer having an MFR or 5.0 g/10 minutes (peak melting temperature=160° C., melting completion temperature=167° C.) and 45 wt % of calcium carbonate having an average grain size of 1.5 µm.

EXAMPLE 35

A composition (A) was prepared by mixing 80 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to the mixture 12 wt % of calcium carbonate having an average grain size of 1.5 µm. The composition (A) was kneaded under fusion in an extruder set at 270° C., extruded from a die in a sheet form, and then cooled using a cooling apparatus to thereby produce a non-stretched sheet. The sheet was re-heated up to 140° C. and stretched five-fold in the longitudinal direction effected by difference in the peripheral speeds of a number of roller groups.

A composition (B) was separately prepared by mixing an amorphous resin with a polyolefinic resin listed in Table 4 in an amount again listed in Table 4. The composition (B) was kneaded under fusion in an extrusion machine set at 270° C., extruded from the die into a sheet form, and the obtained sheet was laminated on one side of the foregoing 5-fold stretched sheet (A). The same sheet was also laminated on the opposite side to thereby obtain a three-layered stack.

The three-layered stack was heated to 155° C., stretched 7.5-fold in the transverse direction using a tenter, and annealed at 163° C. to thereby obtain a three-layered film. The surface of such three-layered film was subjected to corona discharge treatment to thereby obtain a three-layered, stretched resin film having a constitution expressed as (B)/(A)/(B) (in 15 µm/80 µm/15 µm thick).

EXAMPLE 36

A composition (A) was prepared by mixing 80 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to the mixture 12 wt % of calcium carbonate having an average grain size of 1.5 µm. A composition (B) was separately prepared by mixing an amorphous resin with a polyolefinic resin listed in Table 4 in an amount again listed in Table 4. The compositions (A) and (B) were individually kneaded under fusion in separate extrusion machines set at 270° C., stacked within a single die into a sheet form so as to attain a layer constitution of (B)/(A)/(B), co-extruded from the die, and then cooled using a cooling apparatus to thereby produce a non-stretched sheet. The sheet was heated to 155° C., and stretched 5-fold in the longitudinal direction effected by difference in the peripheral speeds of a number of roller groups. The sheet was then again heated to 155° C., stretched 7.5-fold in the transverse direction using a tenter, and annealed at 163° C. to thereby obtain a three-layered film. The surface of such three-layered film was subjected to corona discharge treatment to thereby obtain a three-layered, stretched resin film having a constitution expressed as (B)/(A)/(B) (in 5 µm/50 µm/5 µm thick).

EXAMPLE 37

A composition (A) was prepared by mixing 72 wt % of a propylene homopolymer having a melt flow rate (MFR) of 0.8 g/10 minutes (peak melting temperature=160° C., melting completion temperature=167° C.) and 8 wt % of a high-density polyethylene, and by further adding to the mixture 20 wt % of calcium carbonate having an average grain size of 1.5 µm. A composition (B) was separately prepared by mixing an amorphous resin with a polyolefinic resin listed in Table 4 in an amount again listed in Table 4. The compositions (A) and (B) were individually kneaded under fusion in separate extrusion machines set at 270° C., extruded from a single die into a sheet form so as to attain a layer constitution of (B)/(A)/(B), and then cooled using a cooling apparatus to thereby produce a non-stretched sheet. The sheet was heated to 140° C., stretched five-fold in the longitudinal direction effected by difference in the peripheral speeds of a number of roller groups, and annealed at 145° C. to thereby obtain a three-layered film. The surface of such three-layered film was subjected to corona discharge treatment to thereby obtain a three-layered, stretched resin film having a constitution expressed as (B)/(A)/(B) (in 15 µm/100 µm/15 µm thick)

EXAMPLE 38 TO 47

On one side of the multi-layered stretched resin film obtained in Examples 25, 26, 28, and 31 to 37, a water-soluble coating material was coated so as to form a coated film of 10 g/m², where the coating material comprises 50 wt % of precipitated calcium carbonate (E) (product of Shiraishi Kogyo K.K., Brilliant-15), 10 wt % of kaolin gray (F) (product of Engelhard Corporation, Ultrawhite-90), 35 wt % of acryl/styrene copolymer emulsion (G) (product of Hoechst Gosei K.K., Movinyl 8010) and 5 wt % of specialized modified polyvinyl alcohol (H) (product of Nippon Synthetic Chemical Industry Co., Ltd., Gohsephimar Z-100), and was then dried at 105° C. for 1 minute to thereby obtain a coated film.

The inorganic powders (E) and (F) herein were added with, as a dispersion aid, 0.5 weight parts of specialized sodium polycarboxylate (product of Kao Corporation, Poiz 520) per 100 weight parts of such powders (E) and (F), and the polyvinyl alcohol (H) was added with, as a crosslinking agent, 10 weight parts of polyamide urea-base resin (product of Sumitomo Chemical, Sumirez Resin 633).

(Test Examples)

The multi-layered stretched resin films obtained in Examples 1 to 47 and Comparative Examples 1 to 6 were subjected to measurements of porosity, opacity and smoothness according to the procedures described below, and the offset printability (curl height, waving after printing with a practical printing machine, and ink drying property) was evaluated. Results were shown in Tables 3, 4 and 5.

(1) Porosity

Section of the multi-layered stretched film was observed under a scanning electron microscope, and a ratio of area of voids in the amorphous resin-containing layer (B) was estimated, which was referred to as porosity (%) of the amorphous resin-containing layer (B).

(2) Opacity

Opacity was measured in compliance with JIS P-8138.

(3) Smoothness

The smoothness of the surface layer (C) of the films obtained in Examples 1 to 22 and Comparative Examples 1 to 3 was measured in compliance with JTS P-8119.

(4) Curl Height

Figure 1:
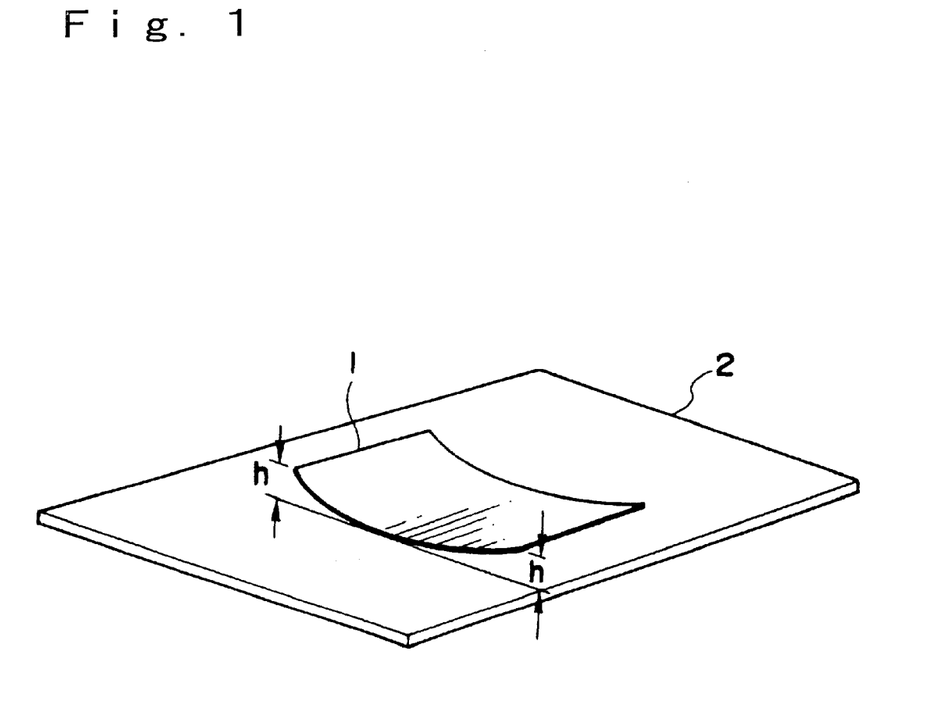
FIG. 1 is a schematic view explaining a curl height, where reference numeral 1 represents a printed matter, 2 represents a flat table, and h represents curl height.

The entire surface of the multi-layered stretched resin film to be evaluated was subjected to printing with a dry type offset printing ink (product of T&K TOKA Company, Supertech Magenta) in a transfer amount of 1.5 g/m² using a printing suitability tester (product of Ishikawajima Industrial Machines, Model R.I.-2). The obtained printed matter was cut into a 10 cm×10 cm piece and allowed to stand on a flat table 2 for a day. Curl height of the printed matter 1 as shown in FIG. 1 was measured at four corners thereof and an average value was found.

(5) Generation of Surface Waving

The multi-layered stretched resin film to be evaluated was subjected to 1,000-sheet continuous printing with dry type offset printing inks of four colors (product of T&K TOKA Company, Supertech Black, Cyan, Magenta and Yellow) in a transfer amount of 1.5 g/m² for each color using a four-color offset printing machine (product of Mitsubishi Heavy Industries, Ltd., Model OF-4). The obtained printed matters were allowed to stand while being stacked in a columnar form. After the inks were dried, waving of the film caused by film areas with or without applied inks was judged by sensory evaluation. Evaluation criteria are as follows:

○: no waving

Δ: waving recognizable x: serious waving (6) Ink Drying Property

The multi-layered stretched resin film to be evaluated was subjected to 1,000-sheet continuous printing with dry type offset printing inks of four colors (product of T&K TOKA Company, Supertech Black, Cyan, Magenta and Yellow) in a transfer amount of 1.5 g/m² for each color using a four-color offset printing machine (product of Mitsubishi Heavy Industries, Ltd., Model OF-4). The obtained printed matters were allowed to stand while being stacked in a columnar form, and sampled for every predetermined time period to be confirmed for the dry status. Evaluation criteria for the ink drying property are as follows:

5: very rapid

4: rapid

3: non-problematic level

4: a little slow and problematic

5: very slow

TABLE 2

Details of Amorphous Resins, Polyolefinic Resins and Fine Powders

| Symbol | Name of material | Trade name | Description |
|---|---|---|---|
| | (Amorphous resin) | | |
| a | cycloolefin-ethylene copolymer | Mitsui Chemicals, Inc., APL6015 | glass transition point = 140° C. |
| b | cycloolefin-ethylene copolymer | Mitsui Chemicals, Inc., A5L6013 | glass transition point = 125° C. |
| c | cycloolefin-ethylene copolymer | Mitsui Chemicals, Inc., APL6509 | glass transition point = 80° C. |
| d | cycloolefin-ethylene copolymer | Mitsui Chemicals, Inc., APL5018 | glass transition point = 16° C. |
| e | cycloolefin-ethylene copolymer | Mitsui Chemicals, Inc., APL6011 | glass transition point = 105° C. |
| f | cycloolefinic polymer | Zeon Corporation, Zeonor 1020R | glass transition point = 105° C. |
| g | atactic polystyrene | A & M Styrene Co., Ltd., GPPS-G5259 | glass transition point = 100° C. |
| | (Polyolefinic resin) | | |
| α | highly-crystallized propylene homopolymer | Nihon Polychem K.K., MA4U | MFR = 5.0 g/10 min crystallinity = 60%, melting peak temperature = 165° C., melting completion temperature = 171° C, |
| â | propylene homopolymer | Nihon Polychem K.K., MA4 | MFR = 5.0 g/10 min, melting peak temperature = 160° C., melting completion temperature = 167° C. |
| ã | ethylene homopolymer | Nihon Polychem K.K., HJ360 | MFR = 5.5 g/10 min, melting peak temperature = 130° C., melting completion temperature 135° C. |
| | (Fine powder) | | |
| A | surface-modified precipitated calcium carbonate | Maruo Calcium Co., Ltd., MC-S5 | average grain size = 0.1 μm, modified with aliphatic acid and sulfonic acid |
| B | surface-modified precipitated calcium carbonate | Maruo Calcium Co., Ltd., MSK-PO | average grain size = 0.15 μm, modified with aliphatic acid |
| C | precipitated calcium carbonate | Shiraishi Kogyo K.K., Brilliant-15 | average grain size = 0.15 μm |
| D | heavy calcium carbonate | Bihoku Funka Kogyo K.K., Soften #3200 | average grain size = 0.7 μm |
| E | heavy calcium carbonate | Bihoku Funka Kogyo K.K., Softon #1800 | average grain size = 1.25 μm |
| F | surface-modified heavy calcium carbonate | Maruo Calcium Co., Ltd., Nanocoat S-25 | average grain size = 1.1 μm, modified with aliphatic acid |

TABLE 3

| | Stretching direction of base layer (A) | Constitution of amorphous resin-containing layer (B) | | | | | | | Constitution of surface layer (C) Fine powder | | Provision of intermediate layer (D) | Smoothness of Stretched film (sec) | Opacity of stretched film (%) | Offset printing Suitability | | |
|---|---|---|---|---|---|---|---|---|---|---|---|---|---|---|---|---|
| | | Amorphous resin | | | Polyofinic resin | | Stretching direction | Porosity (%) | | | | | | Curl height (mm) | Waving in practical printing | Ink drying property |
| | | Type | Glass transition point (°C) | Content (wt %) | Type | Content (wt %) | | | Type | Content (wt %) | | | | | | |
| Example 1 | biaxial | a | 140 | 50 | α | 50 | uniaxial | 4 | A | 55 | yes | 12000 | 94 | 5 | ○ | 5 |
| Example 2 | biaxial | e | 105 | 20 | α | 80 | uniaxial | 0 | A | 55 | yes | 12000 | 94 | 2 | ○ | 5 |
| Example 3 | biaxial | e | 105 | 70 | α | 30 | uniaxial | 0 | A | 55 | yes | 12000 | 94 | 0 | ○ | 5 |
| Example 4 | biaxial | b | 125 | 50 | α | 50 | uniaxial | 0 | A | 55 | yes | 12000 | 94 | 0 | ○ | 5 |
| Example 5 | biaxial | c | 80 | 50 | α | 50 | uniaxial | 0 | A | 55 | yes | 12000 | 94 | 1 | ○ | 5 |
| Example 6 | biaxial | f | 105 | 50 | α | 50 | uniaxial | 0 | A | 55 | yes | 12000 | 94 | 0 | ○ | 5 |
| Example 7 | biaxial | g | 100 | 50 | α | 50 | uniaxial | 0 | A | 55 | yes | 12000 | 94 | 0 | ○ | 5 |
| Example 8 | biaxial | e | 105 | 50 | α | 50 | uniaxial | 0 | A | 35 | yes | 5000 | 93 | 0 | ○ | 4 |
| Example 9 | biaxial | e | 105 | 50 | α | 50 | uniaxial | 0 | A | 45 | yes | 8000 | 93 | 0 | ○ | 5 |
| Example 10 | biaxial | e | 105 | 50 | α | 50 | uniaxial | 0 | A | 55 | yes | 12000 | 94 | 0 | ○ | 5 |
| Example 11 | biaxial | e | 105 | 50 | α | 50 | uniaxial | 0 | A | 65 | yes | 15000 | 94 | 0 | ○ | 5 |
| Example 12 | biaxial | e | 105 | 50 | α | 50 | uniaxial | 0 | B | 55 | yes | 10000 | 94 | 0 | ○ | 5 |
| Example 13 | biaxial | e | 105 | 50 | α | 50 | uniaxial | 0 | C | 45 | yes | 6000 | 93 | 0 | ○ | 5 |
| Example 14 | biaxial | e | 105 | 50 | α | 50 | uniaxial | 0 | D | 55 | yes | 3000 | 94 | 0 | ○ | 5 |
| Example 15 | biaxial | e | 105 | 50 | α | 50 | uniaxial | 0 | E | 55 | yes | 1000 | 94 | 0 | ○ | 5 |
| Example 16 | biaxial | e | 105 | 50 | α | 50 | uniaxial | 0 | F | 55 | yes | 2000 | 94 | 0 | ○ | 5 |
| Example 17 | biaxial | e | 105 | 50 | β | 50 | uniaxial | 0 | A | 55 | yes | 12000 | 94 | 2 | ○ | 5 |
| Example 18 | biaxial | c | 80 | 50 | β | 50 | uniaxial | 0 | A | 55 | yes | 12000 | 94 | 1 | ○ | 5 |
| Example 19 | biaxial | e | 105 | 50 | β / γ | 25 / 25 | uniaxial | 0 | A | 55 | yes | 12000 | 94 | 1 | ○ | 5 |
| Example 20 | biaxial | e | 105 | 50 | α | 50 | uniaxial | 0 | A | 55 | no | 12000 | 91 | 0 | ○ | 5 |
| Example 21 | biaxial | e | 105 | 50 | α | 50 | biaxial | 0 | A | 55 | no | 12000 | 90 | 1 | ○ | 5 |
| Example 22 | uniaxial | c | 80 | 50 | α | 50 | uniaxial | 0 | A | 55 | no | 12000 | 84 | 1 | ○ | 5 |
| Comparative Example 1 | biaxial | — | — | — | β | 55 | uniaxial | 30 | E | 3 | yes | 5000 | 93 | 33 | X | 2 |
| Comparative Example 2 | biaxial | d | 160 | 20 | α | 80 | uniaxial | 26 | E | 55 | yes | 12000 | 96 | 27 | X | 5 |
| Comparative Example 3 | biaxial | d | 160 | 50 | α | 50 | uniaxial | 38 | E | 55 | yes | 12000 | 96 | 30 | X | 5 |

TABLE 4

| | Stretching direction of base layer (A) | Constitution of amorphous resin-containing layer (B) | | | | | | Provision of intermediate layer (D) | Opacity of stretched film % | Offset printing suitability | | |
|---|---|---|---|---|---|---|---|---|---|---|---|---|
| | | Amorphous resin | | | Polyolefinic resin | | Stretching direction | Porosity (%) | | | Curl height (mm) | Waving in practical printing |
| | | Type | Glass transition point (°C) | Content (wt %) | Type | Content (wt %) | | | | | | |
| Example 23 | biaxial | a | 140 | 20 | α | 80 | uniaxial | 3 | yes | 93 | 4 | ○ |
| Example 24 | biaxial | a | 140 | 50 | α | 50 | uniaxial | 5 | yes | 94 | 5 | ○ |
| Example 25 | biaxial | b | 125 | 20 | α | 80 | uniaxial | 0 | yes | 93 | 2 | ○ |
| Example 26 | biaxial | b | 125 | 50 | α | 50 | uniaxial | 0 | yes | 93 | 0 | ○ |
| Example 27 | biaxial | b | 125 | 70 | α | 30 | uniaxial | 0 | yes | 94 | 0 | ○ |
| Example 28 | biaxial | c | 80 | 50 | α | 50 | uniaxial | 0 | yes | 94 | 1 | ○ |
| Example 29 | biaxial | f | 105 | 50 | α | 50 | uniaxial | 0 | yes | 94 | 0 | ○ |
| Example 30 | biaxial | a | 140 | 20 | β | 80 | uniaxial | 2 | yes | 94 | 6 | ○ |
| Example 31 | biaxial | b | 125 | 50 | β | 50 | uniaxial | 0 | yes | 94 | 2 | ○ |
| Example 32 | biaxial | c | 80 | 50 | β | 50 | uniaxial | 0 | yes | 94 | 1 | ○ |
| Example 33 | biaxial | b | 125 | 50 | γ | 50 | uniaxial | 0 | yes | 93 | 2 | ○ |
| Example 34 | biaxial | b | 125 | 50 | β / γ | 25 / 25 | uniaxial | 0 | yes | 93 | 1 | ○ |
| Example 35 | biaxial | b | 125 | 50 | α | 50 | uniaxial | 0 | no | 89 | 0 | ○ |
| Example 36 | biaxial | b | 125 | 50 | α | 50 | biaxial | 0 | no | 88 | 1 | ○ |
| Example 37 | uniaxial | c | 80 | 50 | α | 50 | uniaxial | 0 | no | 83 | 1 | ○ |
| Comparative Example 4 | biaxial | — | — | — | β | 55 | uniaxial | 30 | yes | 96 | 35 | X |
| Comparative Example 5 | biaxial | d | 160 | 20 | α | 80 | uniaxial | 26 | yes | 96 | 29 | X |
| Comparative Example 6 | biaxial | d | 160 | 50 | α | 50 | uniaxial | 38 | yes | 96 | 32 | X |

TABLE 5

| | Stretching direction of base layer (A) | Constitution of amorphous resin containing layer (B) | | | | | | Provision of intermediate layer (D) | opacity of stretched film (%) | Offset printing suitability | | | |
|---|---|---|---|---|---|---|---|---|---|---|---|---|---|
| | | Amorphous resin | | | Polyolefinic resin | | Stretching direction | Porosity (%) | | | Curl height (mm) | Waving in practical printing | Ink drying property |
| | | Type | Glass transition point (°C) | Content (wt %) | Type | Content (wt %) | | | | | | | |
| Example 36 | 25 | b | 125 | 20 | α | 80 | uniaxial | 0 | yes | 96 | 1 | ○ | 5 |
| Example 39 | 26 | b | 125 | 50 | α | 50 | uniaxial | 0 | yes | 96 | 0 | ○ | 5 |
| Example 40 | 28 | c | 80 | 50 | α | 50 | uniaxial | 0 | yes | 96 | 0 | ○ | 5 |
| Example 41 | 31 | b | 125 | 50 | β | 50 | uniaxial | 0 | yes | 96 | 1 | ○ | 5 |
| Example 42 | 32 | c | 80 | 50 | β | 50 | uniaxial | 0 | yes | 96 | 0 | ○ | 5 |
| Example 43 | 33 | b | 125 | 50 | γ | 50 | uniaxial | 0 | yes | 96 | 1 | ○ | 5 |
| Example 44 | 34 | b | 125 | 50 | β / γ | 25 / 25 | uniaxial | 0 | yes | 96 | 0 | ○ | 5 |
| Example 45 | 35 | b | 125 | 50 | α | 50 | uniaxial | 0 | no | 94 | 0 | ○ | 5 |
| Example 46 | 36 | b | 125 | 50 | α | 50 | biaxial | 0 | no | 94 | 1 | ○ | 5 |
| Example 47 | 37 | c | 80 | 50 | α | 50 | uniaxial | 0 | no | 92 | 0 | ○ | 5 |

Industrial Applicability

The multi-layered stretched resin film of the present invention is successfully exempt from being waved or curled due to vehicle contained in offset printing ink during offset printing. This ensures an excellent printability of such multi-layered stretched resin film. The multi-layered stretched resin film is advantageous when used as a material for map, book cover, wrapping paper, book paper, sticker sheet, poster paper, menu sheet, hanging screen, label, shopping bag, cardboard, brochure, and illuminated sign board and so forth.

What is claimed is:

1. A multi-layered stretched resin film comprising:

a base layer (A) containing 40 to 90 wt % of a polyolefinic resin and 10 to 60 wt % of an inorganic fine powder or an organic filler; and an amorphous resin-containing layer (B) provided on at least one side of such base layer (A), and containing 0 to 85 wt % of a polyolefinic resin and 15 to 100 wt % of an amorphous resin;

said amorphous resin-containing layer (B) having a porosity of 5% or below, and having a glass transition point of 70–140° C.

further comprising a surface layer (C) containing 30 to 85 wt % of a polyolefinic resin and 15 to 70 wt % of an inorganic fine powder or an organic filler, said surface layer (C) being provided on at least one side of a stack which comprises said base layer (A) and said amorphous resin-containing layer (B) provided on at least one side thereof.

2. A multi-layered stretched resin film as claimed in claim 1, wherein said surface layer (C) has a thickness of 1 to 100 μm.

3. A multi-layered stretched resin film as claimed in claim 1, wherein the grain size of the inorganic fine powder or the average dispersion grain size of the organic filler in said surface layer (C) is within a range from 0.01 to 6 μm.

4. A multi-layered stretched resin film as claimed in claim 1, wherein the inorganic fine powder or the organic filler in said surface layer (C) comprises calcium carbonate.

5. A multi-layered stretched resin film as claimed in claim 4, wherein the inorganic fine powder or the organic filler in said surface layer (C) comprises surface-modified calcium carbonate.

6. A multi-layered stretched resin film as claimed in claim 1, wherein said surface layer (C) has a smoothness in compliance with JIS P-8119 of 20,000 sec or less.

7. A multi-layered stretched resin film as claimed in claim 1, wherein said surface layer (C) is formed only on one side of said stack.

8. A multi-layered stretched resin film as claimed in claim 1, wherein said surface layer (C) is formed on both sides of said stack.

9. A multi-layered stretched resin film as claimed in claim 1, wherein said base layer (A), said amorphous resin-containing layer (B) and said surface layer (C) containing 30 to 85 wt % of a polyolefinic resin and 15 to 70 wt % of an inorganic fine powder or an organic filler form a stack having any one constitution of (C)/(B)/(A)/(B)/(C), (C)/(B)/(A)/(B), (C)/(B)/(A)/(C), (C)/(B)/(A), and (B)/(A)/(C).

10. A multi-layered stretched resin film as claimed in claim 1, further comprising an intermediate layer (D) comprising a polypropylene-base resin containing 8 to 55 wt % of an inorganic fine powder, said intermediate layer (D) being provided between said base layer (A) and said amorphous resin-containing layer (B) or said surface layer (C).

11. A multi-layered stretched resin film as claimed in claim 10, wherein said intermediate layer (D) contains any one low-melting-point resin selected from the group consisting of propylene-base copolymer, high-density polyethylene, polystyrene and ethylene-vinyl acetate copolymer.

12. A multi-layered stretched resin film as claimed in claim 1 having an opacity in compliance with JIS P-8 138 of 70% or above.

13. A multi-layered stretched resin film as claimed in claim 1 having on the outermost layer thereof a pigment coated layer.

* * * * *